United States Patent [19]
Drugmand

[11] 3,730,262
[45] May 1, 1973

[54] HEATING AND COOLING UNITS

[75] Inventor: Lester D. Drugmand, Pittsburgh, Pa.

[73] Assignee: Emerson Electric Co., Saint Louis, Mo.

[22] Filed: Aug. 6, 1971

[21] Appl. No.: 169,728

[52] U.S. Cl. .........................165/46, 165/48, 165/64
[51] Int. Cl. ................................................F28f 7/00
[58] Field of Search......................165/30, 29, 48, 64, 165/46, 169, 190

[56] References Cited

UNITED STATES PATENTS

| | | |
|---|---|---|
| 1,873,838 | 8/1932 | Gebhard.................................165/30 |
| 2,549,569 | 4/1951 | Bradley...................................165/30 |
| 2,721,729 | 10/1955 | Van Riper..............................165/64 |

*Primary Examiner*—Charles Sukalo
*Attorney*—Michael Williams

[57] ABSTRACT

A heating and cooling unit comprising a flexible metal band formed in halves connected end-to-end around an object. The band carries a sheathed electric heating element and a metal cooling tube so that the object may be either heated or cooled. The heating element and cooling tube are pressed into direct engagement with the peripheral surface of the object when the band is positioned around the latter.

7 Claims, 8 Drawing Figures

Patented May 1, 1973
3,730,262
2 Sheets-Sheet 1
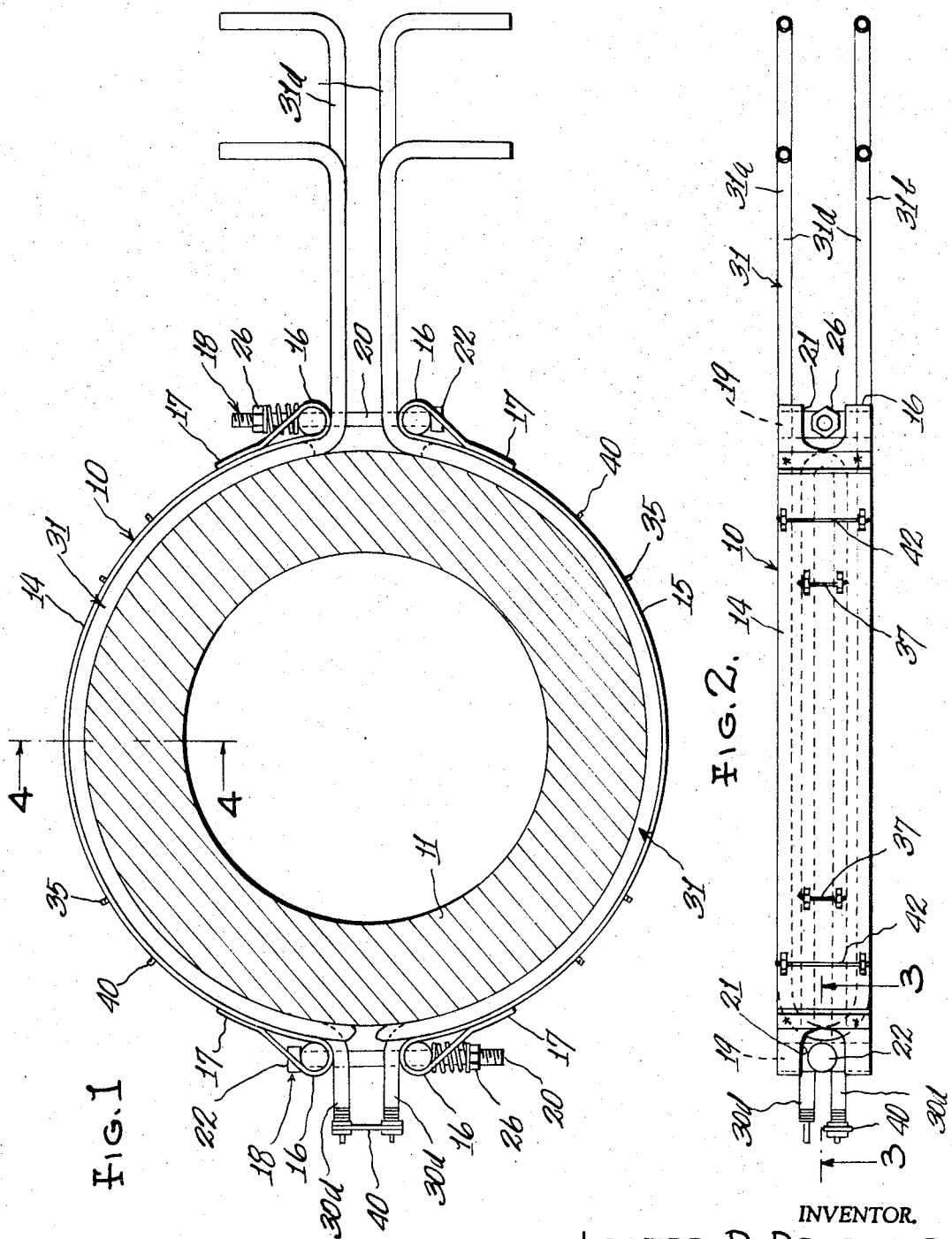
INVENTOR.
LESTER D. DRUGMAND
BY
*Michael Williams*
ATTORNEY

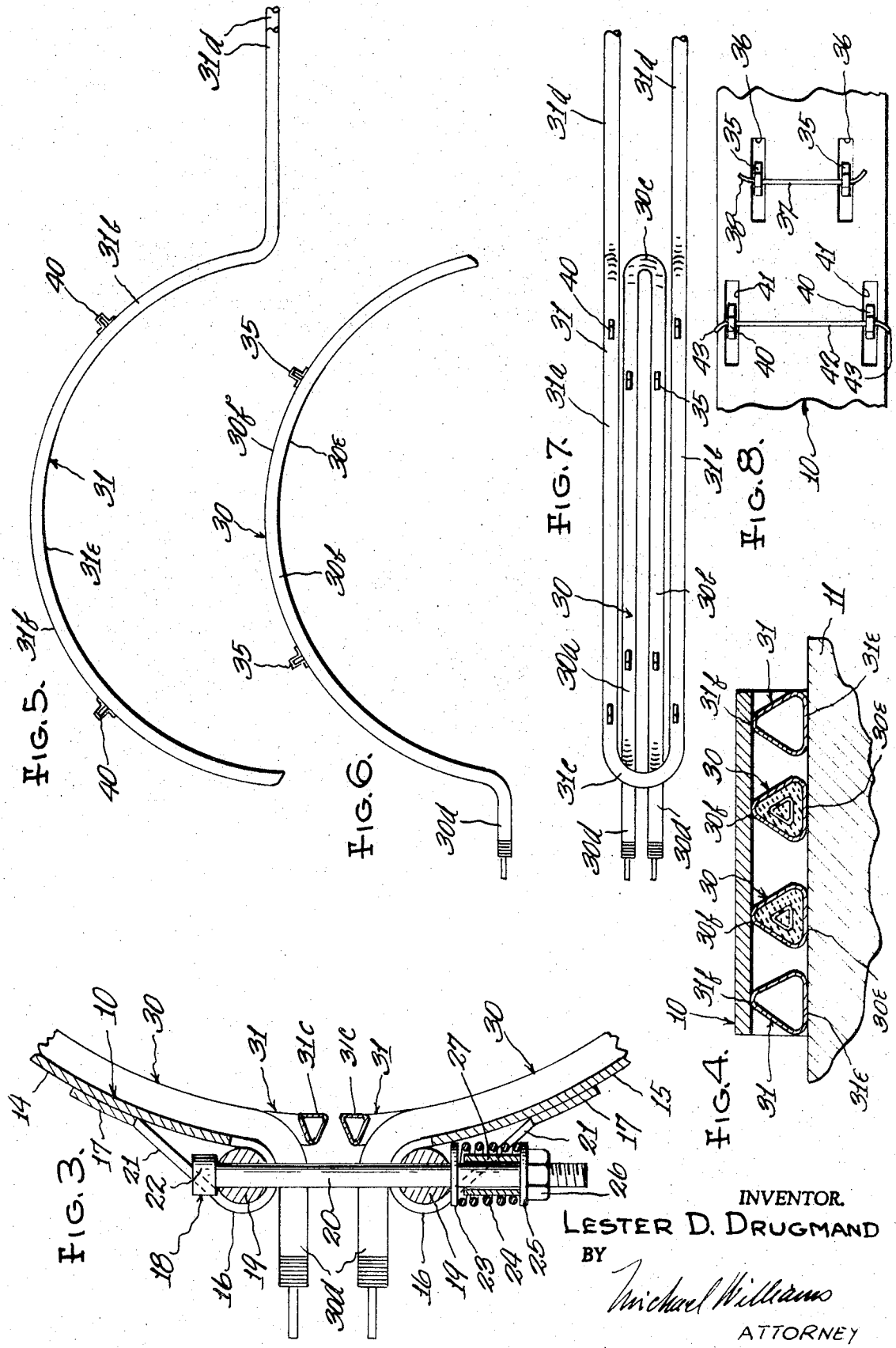

HEATING AND COOLING UNITS

BACKGROUND AND SUMMARY

The improved structure is particularly suited for the heating and cooling of the plasticizing tube of an extruder for thermoplastics, although it will be appreciated that it may have other applications. In extruders for thermoplastics, control of the temperature of the plastic being extruded is important since although initially the extruding chamber may require heat to soften the plastic to proper extrudable condition, consideration must be given to the heat energy developed as a result of the friction of the plastic particles driven forwardly by the extruding screw. Thus, unless the temperature of the plasticizing tube is not carefully controlled, an excess amount of heat may have an adverse effect on the plastic being extruded.

Heating and cooling arrangements for extruding apparatus are within the prior art but in some cases require adaptation of the extruding tube to accommodate the same. Band type arrangements have also been proposed but these, insofar as I am aware, utilized a heat sink structure, like metallic shoes, between the heating and cooling means and the extruder tube, and therefore were not only more expensive to manufacture but also incorporated an objectionable mass which made it difficult to obtain fine control of the heating or cooling cycle.

My invention comprises a flexible metal band which is adapted to be clamped around the plasticizing tube of an extruder the band carrying a sheathed electric heating element and a metal cooling tube, both of which are pressed directly against the peripheral surface of the plasticizing tube so that each may quickly influence the temperature of such tube at the required time.

DESCRIPTION OF THE DRAWINGS

In the drawings accompanying this description and forming a part of this specification, there is shown, for purpose of illustration, an embodiment which my invention may assume, and in these drawings:

FIG. 1 is a section taken transversely through the plasticizing tube of an extruder, my improved construction being shown applied to such tube, FIG. 2 is a plan view of the construction shown in FIG. 1, the plasticizing tube being omitted, FIG. 3 is an enlarged, fragmentary sectional view corresponding to the line 3—3 of FIG. 2, FIG. 4 is an enlarged, fragmentary sectional view corresponding to the line 4—4 of FIG. 1, FIGS. 5 and 6 are side views of the cooling and heating members, respectively, FIG. 7 is a plan view of the members of FIGS. 5 and 6, showing their nested relationship, and FIG. 8 is a fragmentary plan view of a detail.

DESCRIPTION OF THE PREFERRED EMBODIMENT

Although the invention will be particularly described in connection with the heating and cooling of the plasticizing tube of an extruder, it will be appreciated that it may be employed in any other application where heating or cooling is to be applied to the periphery of an object, particularly one round in cross-section.

The disclosed embodiment comprises a flexible metal band 10 which is adapted to be clamped around a cylindrical object, such as the plasticizing tube 11 of a thermoplastic extruder. The details of the extruder are not shown since they form no part of my invention, but in conventional construction plastic material to be extruded is introduced into a hopper at one end of the tube 11 and is forced therethrough by a feed screw to an extruding nozzle at the other end of the tube.

In order that the material to be extruded is heated to proper extruding temperature, one or more of the units of my invention may be applied to the plasticizing tube 11, such devices also embodying cooling means so that in the event the plastic material in the tube becomes too hot, heating may be interrupted and cooling immediately applied.

In the disclosed embodiment, the band 10 is formed in halves 14 and 15, which may be identical, as shown. Each band half has a transverse loop 16 at its end, such loop being formed by rolling over an end of the band and spot welding the extremity to the band half at 17. Tensioning means 18 may be disposed between adjoining loops and in the disclosed embodiment such tensioning means is disposed between each set of adjoining loops, although one set may merely be connected by a hinge joint.

With particular reference to FIG. 3, the tensioning means 18 comprises a short rod 19 confined within each of the adjoining loops 16, each rod having a transverse opening to pass the shank 20 of an elongated bolt. Each loop 16 is slotted, as seen at 21, to provide clearance for certain parts of the tensioning means. The head 22 of the bolt seats against the periphery of one rod 19 (the upper one seen in FIG. 3) and a washer 23 bears against the periphery of the lower rod 19. A coil spring 24 is disposed between the washer 23 and a spaced washer 25, and a nut 26 is threaded on the end of the bolt shank to adjust the pressure of the spring. A sleeve 27 is disposed around the bolt shank and is of a length to prevent the nut 26 to be drawn up an amount to bottom the convolutions of the spring upon each other. Therefore, a certain amount of spring action is always present. In some cases the upper rod 19 (FIG. 3) and the bolt shank may be formed as an integral T-shaped unit, thus eliminating the need for the head 22 and preventing the bolt from dropping before the nut 26 is applied when the tensioning device is disposed in the reverse position shown at the right hand side of the band in FIG. 1.

To assemble the band 10 on the tube 11, the nut 26 of one tensioning means may be loosely applied so that the band halves may be sufficiently opened around the pivot provided by the one tensioning means to transversely clear the tube 11, and then the band halves are closed and the other tensioning means 18 connected to the band halves. The nuts 26 may thereafter be adjusted to establish proper clamping force of the band.

My invention comprises a sheathed electric heating element and a metal cooling tube carried by the band to be pressed directly against the peripheral surface of the plasticizing tube 11 and, in the disclosed embodiment, each band half carries a sheathed electric heating element 30 and a metal cooling tube 31. FIGS. 5 and 6 shows these parts for the upper band half 14, and identical parts will be carried by the lower band half 15, but in inverted relation from that shown.

Each of the heating elements 30 and cooling tubes 31 is preferably sickle-shaped, as seen in FIGS. 5 and 6, and of hairpin formation as seen in FIG. 7. Therefore, the heating element 30 has a pair of legs 30a, 30b, joined by a bight 30c and also has terminal portions 30d, 30d. Likewise, each cooling tube 31 has a pair of legs 31a, 31b, joined by a bight 31c, and also has terminal portions 31d, 31d. Each set comprising a heating element and a cooling tube is nested, as seen in FIG. 7, and preferably the spacing between the legs 31a, 31b, of the cooling tube is greater than the spacing between the legs 30a, 30b of the heating element so that the latter legs lie between the former, with the bight 31c permitting the terminal portions 30d, 30d to pass therethrough.

The electric heating elements 30 may be formed in accordance with conventional practice, such as shown in U.S. Pat. No. 2,428,899, issued to Edwin L. Wiegand. As disclosed in said patent, a coiled resistance wire is disposed within a straight metal sheath and granular refractory material insulates the resistance wire from the sheath. Terminal pins are connected to opposite ends of the resistance wire and extend from opposite ends of the sheath. The metal sheath is side-pressed to triangular cross-section and the element may then be bent to the sickle shape shown in FIG. 5, so that its arcuate portion approximately corresponds to the periphery of the plasticizing tube 11.

FIG. 4 illustrates the cross-sectional shape of the electric heating element and as seen the sheath is triangular with a flat surface 30e adapted to be pressed directly against the peripheral surface of the plasticizing tube 11 for increased thermal transfer. The apex 30f directly opposite the flat surface bears against the inner surface of the band 10 to provide a minimum of thermal conduction to the latter. Instead of the triangular shaped described, the round sheath may be side-pressed to provide a flat surface (for engagement with the plasticizing tube) with the remainder of the cross-section round, as shown in U.S. Pat. No. 2,328,113, issued to W. R. Tuttle et al.

The heating elements 30, 30 are connected to respective band halves 14, 15 in any suitable manner, and as herein disclosed two small metal U-shaped clips 35,35 are welded to the apex 30f and extend through elongated openings 36, 36 in the band half. A wire 37 is passed through the clips 35 exteriorly of the band and has its ends bent over as seen at 38. It will be appreciated that this connection provides for relative movement between the heating element and the band to accommodate for expansion and contraction.

The terminal portions 30d, 30d of each heating element extend through the space between adjoining band loops 16, 16 (those loop at the left hand of the band as seen in FIG. 1) and straddle the tensioning bolt shank 20, and a jumper strap 40 may be connected across a pair of vertically aligned terminal pins to connect the heating elements in series relation.

Each cooling tube 31 is also side-pressed to the same cross-section as the heating elements, and is disposed with a flat surface 31e pressed against the periphery of the plasticizing tube 11 and the band 10 pressed against an apex 31f. Two small metal U-shaped clips 40,40 are welded to the apex 31f of each cooling tube and such clips pass through openings 41,41 in the band. A wire 42 is passed through aligned clips on the cooling tube legs, and the ends of the wire are bent over, as shown at 43 in FIG. 8 to hold the cooling tubes assembled with the band. The openings 41 are elongated to permit relative movement of the cooling tubes and band for expansion and contraction.

The terminal portions 31d, 31d of each cooling tube extend through the space between adjoining band loops 16,16 (those loops at the right hand of the band as seen in FIG. 1) and straddle the tensioning bolt shank 20. The terminal portions 31d, 31d may be connected to a source of cooling fluid, such as water, so that such fluid flows into one terminal portion of a cooling tube and exits through the other terminal portion.

Suitable electrical connections and water connections (not shown) may be made to the electric heating units and the cooling tubes, respectively, and suitable switches and valves (not shown) may be utilized to control energization of the heating elements 30 and flow of cooling water through the tubes 31, depending upon the temperature of the plastic material being extruded. Since the heating elements and cooling tubes have flat surfaces pressed directly against the periphery of the plasticizing tubes 11, heating and cooling may be quickly effected, and since no further mass (like metal shoes) in interposed, there is no time lag between the effectiveness of the heating and cooling cycles.

As seen in FIGS. 4 and 7, the legs 30a, 30b of each heating element 30 are disposed between the legs 31a, 31b of each cooling tube. During the heating cycle, no water flows through the legs of the cooling tube and such legs block the side openings of the band and thus provide a shield to minimize heat loss through the band side openings and therefore provide for concentration of heat on the plasticizing tube 11.

I claim:

1. A heating and cooling unit for a tubular object, comprising a flexible metallic band formed in sections which are connected end-to-end to clamp around said object, a sheathed electric heating element and a metal cooling tube carried by said band, said heating element and tube being of arcuate shape to generally conform to the curvature of the periphery of said object, said heating element and tube being pressed directly in contact with the peripheral surface of said object when said band is clamped around the latter.

2. A heating and cooling unit for a tubular object, comprising a flexible metallic band formed in halves which are connected end-to-end to clamp around said object, each band half carrying a sheathed electric heating element and a metal cooling tube and said element and tube being of arcuate shape to generally conform to the curvature of the periphery of said object, each heating element and cooling tube being pressed directly in contact with the peripheral surface of said object when said band is clamped around the latter.

3. The construction according to claim 2 wherein each heating element and cooling tube comprises a pair of side-by-side legs, with the legs of said cooling tubes on opposite sides of the legs of said heating element to shield against heat loss from the latter outwardly of the sides of said band.

4. The construction according to claim 2 wherein adjoining ends of said band halves are formed with loops, and tensioning means are connected between such loops to draw the band around said object.

5. The construction according to claim 2 wherein each of said heating elements has terminal portions extending laterally and outwardly of said band between one pair of adjoining ends for connection to a source of electrical energy, and wherein each of said cooling tubes has terminal portions extending laterally and outwardly of said band between the other pair of adjoining ends for connection to a source of cooling fluid.

6. A heating and cooling unit for a tubular object, comprising a flexible metallic band formed in halves which are connected end-to-end to clamp around said object, each band half having loops at opposite ends, tensioning means connected between adjoining loops for drawing said band halves around said object, each band half carrying a sheathed electric heating element and a metal cooling tube, both of hair-pin formation to provide legs in side-by-side relation, and both of arcuate shape to generally conform to the curvature of the periphery of said object, each of said elements and said cooling tube having means extending from an outer peripheral surface for connecting the same to a respective band to permit relative peripheral movement for expansion and contraction, the inner peripheral surface of each said element and tube being flattened and pressed against the peripheral surface of said object when said band halves are drawn around the latter, the legs of each heating element being disposed between the legs of the respective cooling tube to be shielded against heat loss when the elements and tubes are pressed against the peripheral surface of said object.

7. A heating and cooling unit for a tubular object, comprising a flexible metallic band adapted to be clamped transversely around said object, an elongated sheathed electric heating element and an elongated metal cooling tube carried by said band and extending longitudinally along the inner surface thereof in side-by-side relation, said heating element and said cooling tube being shaped longitudinally to generally conform to the transverse configuration of said object and being pressed directly in contact with the peripheral surface of said object when said band is clamped around the latter.

* * * * *